United States Patent
Yoon et al.

(10) Patent No.: US 10,725,331 B2
(45) Date of Patent: Jul. 28, 2020

(54) DISPLAY DEVICE INCLUDING A LIGHT AMOUNT CONTROL LAYER

(71) Applicant: SAMSUNG DISPLAY CO., LTD., Yongin-si, Gyeonggi-do (KR)

(72) Inventors: Yeogeon Yoon, Suwon-si (KR); Kyungbae Kim, Seongnam-si (KR); Youngmin Kim, Asan-si (KR); Ilgon Kim, Seoul (KR); Jangil Kim, Asan-si (KR); Cheolwoo Park, Suwon-si (KR); Suwan Woo, Suwon-si (KR); Seontae Yoon, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 223 days.

(21) Appl. No.: 15/803,308

(22) Filed: Nov. 3, 2017

(65) Prior Publication Data
US 2018/0129098 A1    May 10, 2018

(30) Foreign Application Priority Data
Nov. 10, 2016  (KR) .................. 10-2016-0149482

(51) Int. Cl.
*G02F 1/1335*    (2006.01)
*G02F 1/13357*    (2006.01)
(Continued)

(52) U.S. Cl.
CPC .. *G02F 1/133512* (2013.01); *G02F 1/133602* (2013.01); *G02F 1/133617* (2013.01);
(Continued)

(58) Field of Classification Search
None
See application file for complete search history.

(56) References Cited

U.S. PATENT DOCUMENTS

| 9,146,419 B1* | 9/2015 | Anandan ............. G02B 6/0073 |
| 2008/0231779 A1* | 9/2008 | Shin .................. G02F 1/136213 |
|  |  | 349/106 |

(Continued)

FOREIGN PATENT DOCUMENTS

| KR | 10-2002-0091457 | 12/2002 |
| KR | 10-2008-0086730 | 9/2008 |
| KR | 10-2015-0130578 | 11/2015 |

*Primary Examiner* — Ryan Crockett
(74) *Attorney, Agent, or Firm* — F. Chau & Associates, LLC

(57) ABSTRACT

A display device includes: a backlight unit configured to emit light; a first substrate positioned in a path of a light emitted from the backlight unit and including a first pixel and a second pixel displaying different colors from each other; a second substrate facing the first substrate; a light amount control layer positioned between the first substrate and the second substrate; a gate line disposed on the first substrate and extending in a first direction; a storage line disposed on the substrate and spaced apart from the gate line; and a data line disposed on the first substrate and extending in a second direction intersecting the first direction. The first pixel includes a first thin film transistor, a first pixel electrode, and a first light conversion unit. The second pixel electrode includes a second thin film transistor, and a second light conversion unit.

24 Claims, 12 Drawing Sheets

(51) Int. Cl.
*G02F 1/1362* (2006.01)
*G02F 1/163* (2006.01)
(52) U.S. Cl.
CPC .. *G02F 1/136213* (2013.01); *G02F 1/136286* (2013.01); *G02F 1/133528* (2013.01); *G02F 2001/1635* (2013.01)

(56) References Cited

U.S. PATENT DOCUMENTS

| | | | | |
|---|---|---|---|---|
| 2009/0115952 | A1* | 5/2009 | Nakamura | G02B 5/201 |
| | | | | 349/143 |
| 2010/0245679 | A1* | 9/2010 | Shohraku | G02F 1/136213 |
| | | | | 348/731 |
| 2011/0058138 | A1* | 3/2011 | Huh | C09K 19/20 |
| | | | | 349/185 |
| 2012/0120346 | A1* | 5/2012 | Inoue | G02F 1/133753 |
| | | | | 349/85 |
| 2015/0331279 | A1* | 11/2015 | Kimura | G02B 5/201 |
| | | | | 349/42 |
| 2015/0331290 | A1* | 11/2015 | Jung | G02F 1/134309 |
| | | | | 349/38 |
| 2016/0315127 | A1* | 10/2016 | Yoon | H01L 27/3218 |
| 2017/0059944 | A1* | 3/2017 | Xu | G02F 1/1343 |
| 2017/0176819 | A1* | 6/2017 | Park | G02F 1/134363 |

\* cited by examiner

DISPLAY DEVICE INCLUDING A LIGHT AMOUNT CONTROL LAYER

CROSS-REFERENCE TO RELATED APPLICATION

This application claims priority under 35 U.S.C. § 119 to Korean Patent Application No. 10-2016-0149482, filed on Nov. 10, 2016 in the Korean Intellectual Property Office, the disclosure of which is incorporated by reference herein in its entirety.

TECHNICAL FIELD

Exemplary embodiments of the present invention relate to a display device, and more particularly to a display device including a light amount control layer.

DISCUSSION OF RELATED ART

Display devices may be liquid crystal display ("LCD") devices, organic light emitting diode ("OLED") display devices, plasma display panel ("PDP") devices, or electrophoretic display devices.

A display device may include a fluorescent pattern. A display device including the fluorescent pattern may be referred to as a photoluminescent display ("PLD") device.

The photoluminescent display device may include a blue light source, a red phosphor, a green phosphor, and a blue phosphor. The red phosphor may convert blue collimated light into red scattered light. The green phosphor may convert blue collimated light into green scattered light. The blue phosphor may covert blue collimated light into blue scattered light. Thus, respective ones of red, green, and blue colors may be produced.

However, a blue light absorption rate and a blue light conversion ratio of each of the red phosphor, the green phosphor and the blue phosphor may be different from each other.

SUMMARY

Exemplary embodiments of the present invention provide a display device, and more particularly a photoluminescent display device having an increased display quality.

Exemplary embodiments of the present invention provide a display device. The display device includes a backlight, a first substrate, a second substrate, a light amount control layer, a gate line, a storage line, and a data line. The backlight is configured to emit light. The first substrate is positioned in a path of a light emitted from the backlight unit. The first substrate includes a first pixel and a second pixel. The first pixel and the second pixel display different colors from each other. The second substrate faces the first substrate. The light amount control layer is positioned between the first substrate and the second substrate. The gate line is disposed on the first substrate. The gate line extends in a first direction. The storage line is disposed on the first substrate. The storage line is spaced apart from the gate line. The data line is disposed on the first substrate. The data line extends in a second direction. The second direction intersects the first direction. The first pixel includes a first thin film transistor, a first pixel electrode, and a first light conversion unit. The first thin film transistor is connected to the gate line and the data line. The first pixel electrode is connected to the first thin film transistor. The first light conversion unit is disposed on the second substrate and overlapping the first pixel electrode along a direction orthogonal to an upper surface of the first substrate. The second pixel includes a second thin film transistor, a second pixel electrode, and a second light conversion unit. The second thin film transistor is connected to the gate line and the data line. The second pixel electrode is connected to the second thin film transistor. The second light conversion unit is disposed on the second substrate overlapping the second pixel electrode along a direction orthogonal to an upper surface of the first substrate. An area of the first pixel electrode is different than an area of the second pixel electrode. An overlap area between the first pixel electrode and the storage line and an overlap area between the second pixel electrode and the storage line are different from each other.

The first substrate may further include a third pixel. The third pixel may display a color different from a color of the first pixel and a color of the second pixel. The third pixel may include a third thin film transistor and a third pixel electrode. The third thin film transistor may be connected to the gate line and the data line. The third pixel electrode may be connected to the third thin film transistor. An area of the third pixel electrode may be different than an area of the first pixel electrode and an area of the second pixel electrode. An overlap area between the third pixel electrode and the storage line may be different from the overlap area between the first pixel electrode and the storage line and the overlap area between the second pixel electrode and the storage line.

The first pixel may display red, the second pixel may display green, and the third pixel may display blue.

An area ratio of the first pixel electrode, the second pixel electrode and the third pixel electrode may be about 1.1 to 1.3:1:0.7 to 0.9.

The overlap area between the first pixel electrode and the storage line may be less than the overlap area between the second pixel electrode and the storage line.

The overlap area between the second pixel electrode and the storage line may be less than the overlap area between the third pixel electrode and the storage line.

The first thin film transistor may include a first gate electrode, a first semiconductor layer, a first source electrode, and a first drain electrode. The first thin film transistor may branch from the gate line. The first semiconductor layer may be insulated from and may overlap the first gate electrode. The first source electrode and a first drain electrode may be disposed on the first semiconductor layer and may be spaced apart from each other. The second thin film transistor may include a second gate electrode, a second semiconductor layer, a second source electrode, and a second drain electrode. The second gate electrode may branch from the gate line. The second semiconductor layer may be insulated from and may overlap the second gate electrode. The second source electrode and a second drain electrode may be disposed on the second semiconductor layer and may be spaced apart from each other. An overlap area between the first gate electrode and the first drain electrode and an overlap area between the second gate electrode and the second drain electrode may be different from each other.

The overlap area between the first gate electrode and the first drain electrode may be larger than the overlap area between the second gate electrode and the second drain electrode.

The third thin film transistor may include a third gate electrode, a third semiconductor layer, a third source electrode, and a third drain electrode. The third gate electrode may branch from the gate line. The third semiconductor layer may be insulated from and may overlap the third gate electrode. The third source electrode and the third drain electrode may be disposed on the third semiconductor layer and may be spaced apart from each other. An overlap area between the third gate electrode and the third drain electrode may be different from the overlap area between the first gate electrode and the first drain electrode and the overlap area between the second gate electrode and the second drain electrode.

The overlap area between the second gate electrode and the second drain electrode may be larger than the overlap area between the third gate electrode and the third drain electrode.

The first light conversion unit may include a red phosphor, and the second light conversion unit may include a green phosphor.

The red phosphor and the green phosphor may include at least one selected from a quantum dot, a quantum rod or a tetrapod quantum dot.

The quantum dot may have a core-shell structure including a core and a shell covering the core. The core may include at least one selected from: CdSe, CdS, CdTe, ZnS, ZnSe, ZnTe, CdSeTe, CdZnS, CdSeS, PbSe, PbS, PbTe, AgInZnS, HgS, HgSe, HgTe, GaN, GaP, GaAs, InP, InZnP, InGaP, InGaN, InAs and ZnO, and the shell may include at least one selected from the group consisting of: CdS, CdSe, CdTe, CdO, ZnS, ZnSe, ZnSeS, ZnTe, ZnO, InP, InS, GaP, GaN, GaO, InZnP, InGaP, InGaN, InZnSCdSe, PbS, TiO, SrSe or HgSe.

The red phosphor and the green phosphor may include at least one selected from: $Y_3Al_5O_{12}:Ce^{3+}$(YAG:Ce), $Tb_3Al_5O_{12}:Ce^{3+}$(TAG:Ce), $(Sr,Ba,Ca)_2SiO_4:Eu^{2+}$, $(Sr,Ba,Ca,Mg,Zn)_2Si(OD)_4:Eu^{2+}$(D=F,Cl,S,N,Br), $Ba_2MgSi_2O_7:Eu^{2+}$, $Ba_2SiO_4:Eu^{2+}$, $Ca_3(Sc,Mg)_2Si3O_{12}:Ce^{3+}$, $(Ca,Sr)S:Eu^{2+}$, $(Sr,Ca)Ga_2S_4:Eu^{2+}$, $SrSi_2O_2N_2:Eu^{2+}$, $SiAlON:Ce^{3+}$, $\beta$-SiAlON:$Eu^{2+}$, Ca-$\alpha$-SiAlON:$Eu^{2+}$, $Ba_3Si_6O_{12}N_2:Eu^{2+}$, $CaAlSiN_3:Eu^{2+}$, $(Sr,Ca)AlSiN_3:Eu^{2+}$, $Sr_2Si_5N_8:Eu^{2+}$, $(Sr,Ba)Al_2O_4:Eu^{2+}$, $(Mg,Sr)Al_2O_4:Eu^{2+}$ or $BaMg_2Al_{16}O_{27}:Eu^{2+}$ The backlight unit may emit blue light.

The display device may further include a polarizer disposed between the light amount control layer and the second substrate.

Exemplary embodiments of the present invention provide a display device. The display device includes a backlight, a first substrate, a second substrate, a light amount control layer, a first light conversion unit, a second light conversion unit, and a black matrix. The backlight is configured to emit light. The first substrate is positioned in a path of a light emitted from the backlight unit. The first substrate includes a first pixel and a second pixel. The first pixel and the second pixel display different colors from each other. The second substrate faces the first substrate. The light amount control layer is positioned between the first substrate and the second substrate. The first light conversion unit is positioned between the light amount control layer and the second substrate overlapping the first pixel along a direction orthogonal to an upper surface of the first substrate. The second light conversion unit is positioned between the light amount control layer and the second substrate overlapping the second pixel along a direction orthogonal to an upper surface of the first substrate. The black matrix is disposed on the second substrate. The black matrix includes a first opening and a second opening. The first opening overlaps the first pixel along a direction orthogonal to an upper surface of the first substrate. The second opening overlaps the second pixel along a direction orthogonal to an upper surface of the first substrate. An area of the first opening is different than an area of the second opening.

The first substrate may further include a third pixel. The third pixel may display a color different from a color of the first pixel and a color of the second pixel. The black matrix may have a third opening. The third opening may correspond to the third pixel. An area of the third opening may be different area than the area of the first opening and the area of the second opening.

The first pixel may display red, the second pixel may display green, and the third pixel may display blue.

An area ratio of the first opening, the second opening and the third opening may be about 1.1 to 1.3:1:0.7 to 0.9.

BRIEF DESCRIPTION OF THE DRAWINGS

A more complete appreciation of the present invention will become more apparent by describing in detail exemplary embodiments thereof with reference to the accompanying drawings, in which.

DETAILED DESCRIPTION OF THE EMBODIMENTS

Figure 1:
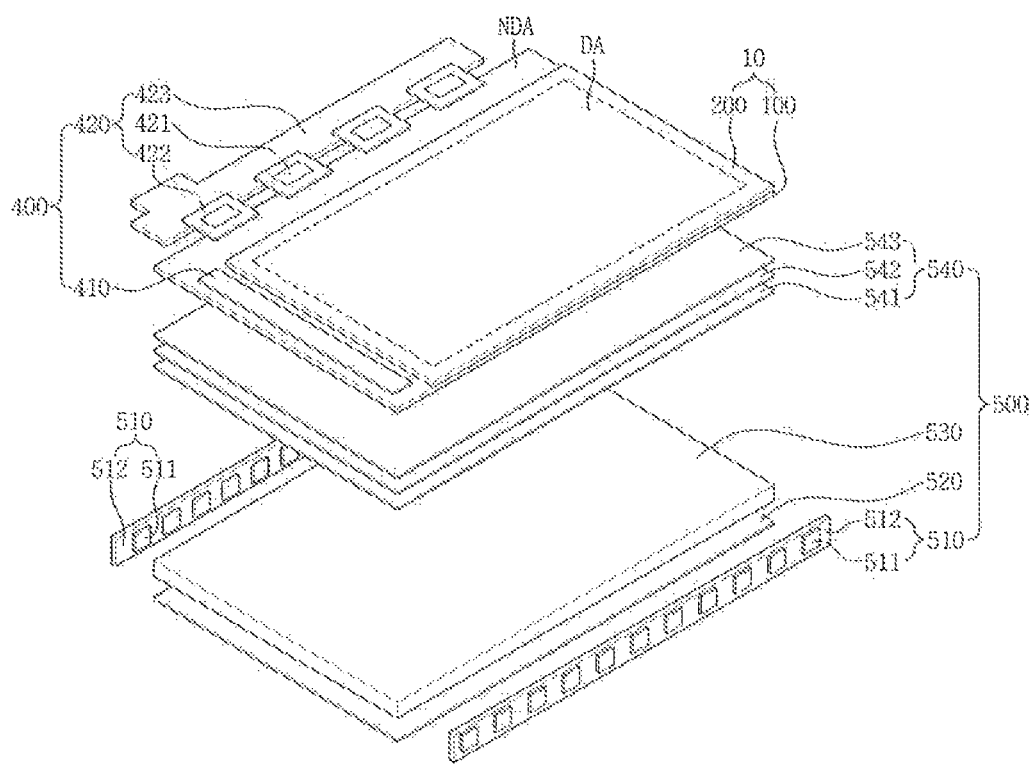
FIG. 1 is an exploded perspective view illustrating a display device according to an exemplary embodiment of the present invention.

Exemplary embodiments of the present invention will be described below in more detail with reference to the accompanying drawings. In this regard, the exemplary embodiments may have different forms and should not be construed as being limited to the exemplary embodiments of the present invention described herein.

Like reference numerals may refer to like elements throughout the specification and drawings.

It will be understood that although the terms "first" and "second" may be used herein to describe various components, these components should not be limited by these terms.

Sizes of elements in the drawings may be exaggerated for clarity of description.

It will be understood that when a component, such as a layer, a film, a region, or a plate, is referred to as being "on" another component, the component can be directly on the other component or intervening components may be present.

FIG. 1 is an exploded perspective view illustrating a display device according to an exemplary embodiment of the present invention.

Referring to FIG. 1, the display device may include a display panel 10, a driver 400 and a backlight unit 500.

The display panel 10 may include a display substrate 100, an opposing substrate 200, and a light amount control layer. The light amount control layer may be disposed between the display substrate 100 and the opposing substrate 200. The display panel 10 may include a display area DA and a non-display area NDA. An image may be displayed in the display area DA. The non-display area NDA may at least partially surround the display area DA.

The light amount control layer of the display panel 10 may control transmittance of light provided from the backlight unit 500. For example, the light amount control layer may include a liquid crystal layer, an electro-wetting layer, or an electrophoresis layer. The light amount control layer may be a liquid crystal layer; however, exemplary embodiments of the present invention are not limited thereto. The display device may be a liquid crystal display ("LCD") device.

The driver 400 may include a gate driver 410 and a data driver 420. The gate driver 410 may be positioned in the non-display area NDA of the display panel 10. The gate driver 410 may generate gate signals, for example, according to a gate control signal. The gate control signal may be provided from a timing controller. The gate driver 410 may sequentially apply the gate signals to a plurality of gate lines.

The data driver 420 may include a plurality of data driving integrated circuits (ICs) 421, a carrier 422, and a printed circuit board 423. The data driving ICs may be disposed on the carrier 422. The data driving ICs 421 may receive digital image data signals and a data control signal. The digital image data signals and the data control signal may be provided from a timing controller. The data driving ICs 421 may apply the digital image data signals and the data control signal to a plurality of data lines.

The backlight unit 500 may include a light source unit 510, a reflective plate 520, a light guide plate 530, or an optical sheet 540. The light source unit 510 may generate light. The light generated in the light source unit 510 may be provided to the display panel 10, for example, through the light guide plate 530 and the optical sheet 540.

The light source unit 510 may include at least one light source 511 and a light source circuit board 512. For example, the light source 511 may provide blue light to the display panel 10 through the light guide plate 530, or the optical sheet 540. The optical sheet 540 may diffuse and collimate light transmitted from the light guide plate 530. The optical sheet 540 may include a diffusion sheet 541, a light collimation sheet 542, or a protective sheet 543.

Figure 2:
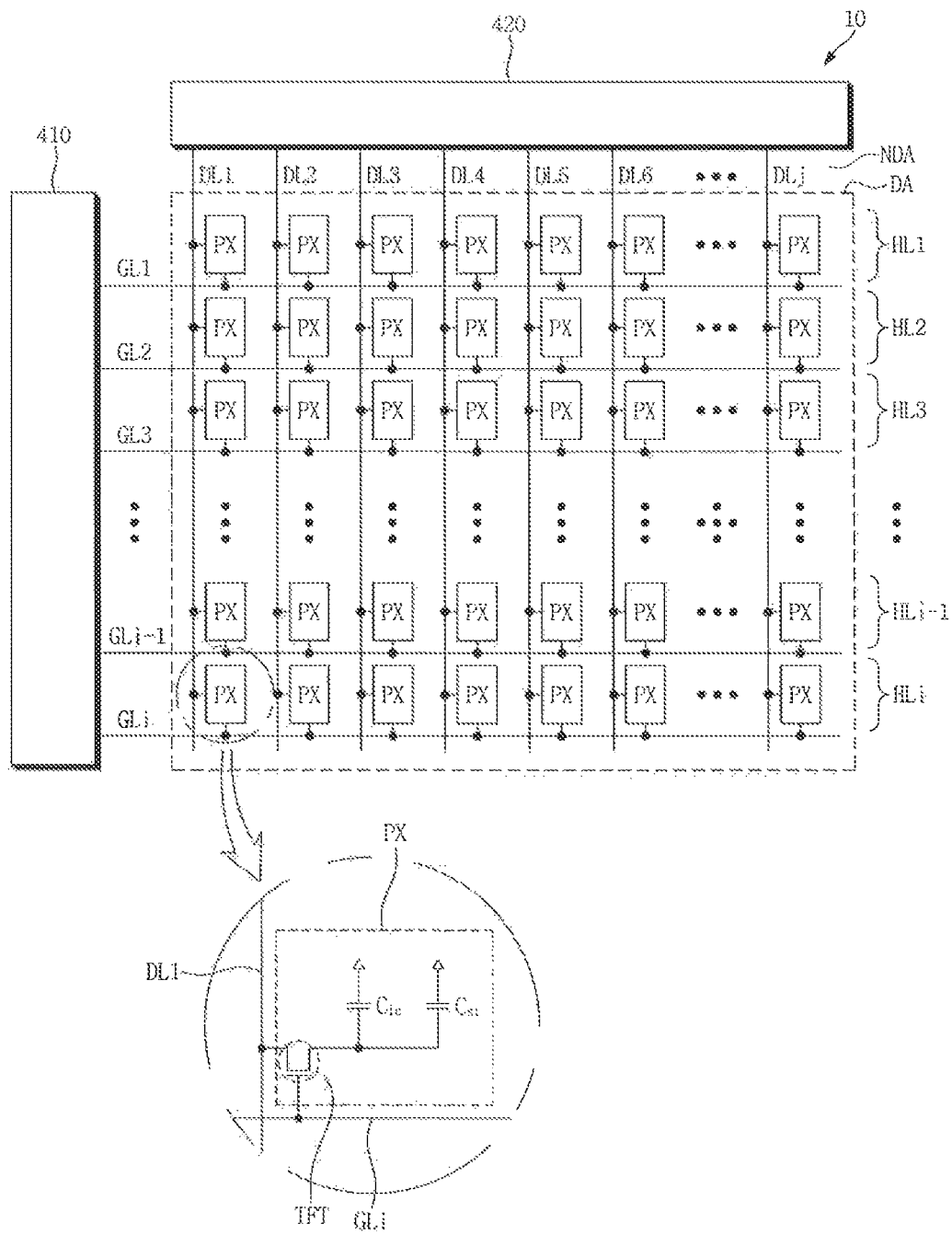
FIG. 2 is a view illustrating pixels arranged on a display panel according to an exemplary embodiment of the present invention.

FIG. 2 is a view illustrating pixels arranged on a display panel according to an exemplary embodiment of the present invention.

Referring to FIGS. 1 and 2, the display panel 10 may include a plurality of gate lines GL1, GL2, GL3, ..., GLi−1, and GLi and a plurality of data lines DL1, DL2, DL3, DL4, DL5, DL6, ..., and DLj. The data lines DL1 to DLj may intersect the gate lines GL1 to GLi. The gate lines GL1 to GLi may extend to the non-display area NDA. The gate lines GL1 to GLi may be connected to the gate driver 410. The data lines DL1 to DLj may extend to the non-display area NDA. The data lines DL1 to DLj may be connected to the data driver 420.

Referring to FIG. 2, the pixel PX may be positioned in the display area DA of the display panel 10. The plurality of pixels PX adjacent to each other may form a single unit pixel. For example, a plurality of adjacent pixels PX connected to a same gate line may form a single unit pixel.

Adjacent pixels PX may be connected to different data lines. Referring to FIG. 2, a first pixel PX may be connected to an odd-numbered data line (e.g., DL1), and a second pixel PX adjacent to the first pixel PX may be connected to an even-numbered data line (e.g., DL2).

According to an exemplary embodiment of the present invention, j number of pixels (hereinafter, n-th horizontal line pixels) arranged along an n-th (n being one selected from 1 to i) horizontal line may be individually connected to the first to j-th data lines DL1 to DLj, respectively. The n-th horizontal line pixels may be connected in common to an n-th gate line. Accordingly, the n-th horizontal line pixels may receive an n-th gate signal as a common signal. As an example, j number of pixels in a same horizontal line may each receive a same gate signal. However, pixels in different horizontal lines may receive different gate signals, respectively. For example, pixels PX in a first horizontal line HL1 may each receive a first gate signal. Pixels PX in a second horizontal line HL2 may each receive a second gate signal. The second gate signal may have a different timing than a timing of the first gate signal.

Referring to FIG. 2, a thin film transistor ("TFT") may be turned to an ON state according to a gate signal applied from the gate line GLi. A TFT in an ON state may transmit an analog image data signal to a pixel electrode. The analog image data signal may be provided from the data line DL1.

A liquid crystal capacitance Clc may be formed between the pixel electrode and an opposing electrode. The pixel electrode and the opposing electrode may be positioned opposite to each other. For example, the pixel electrode may be disposed below the opposing electrode. A storage capacitor Cst may be formed between the pixel electrode and a storage line. The pixel electrode and the storage line may be positioned opposite to each other.

Figure 3:
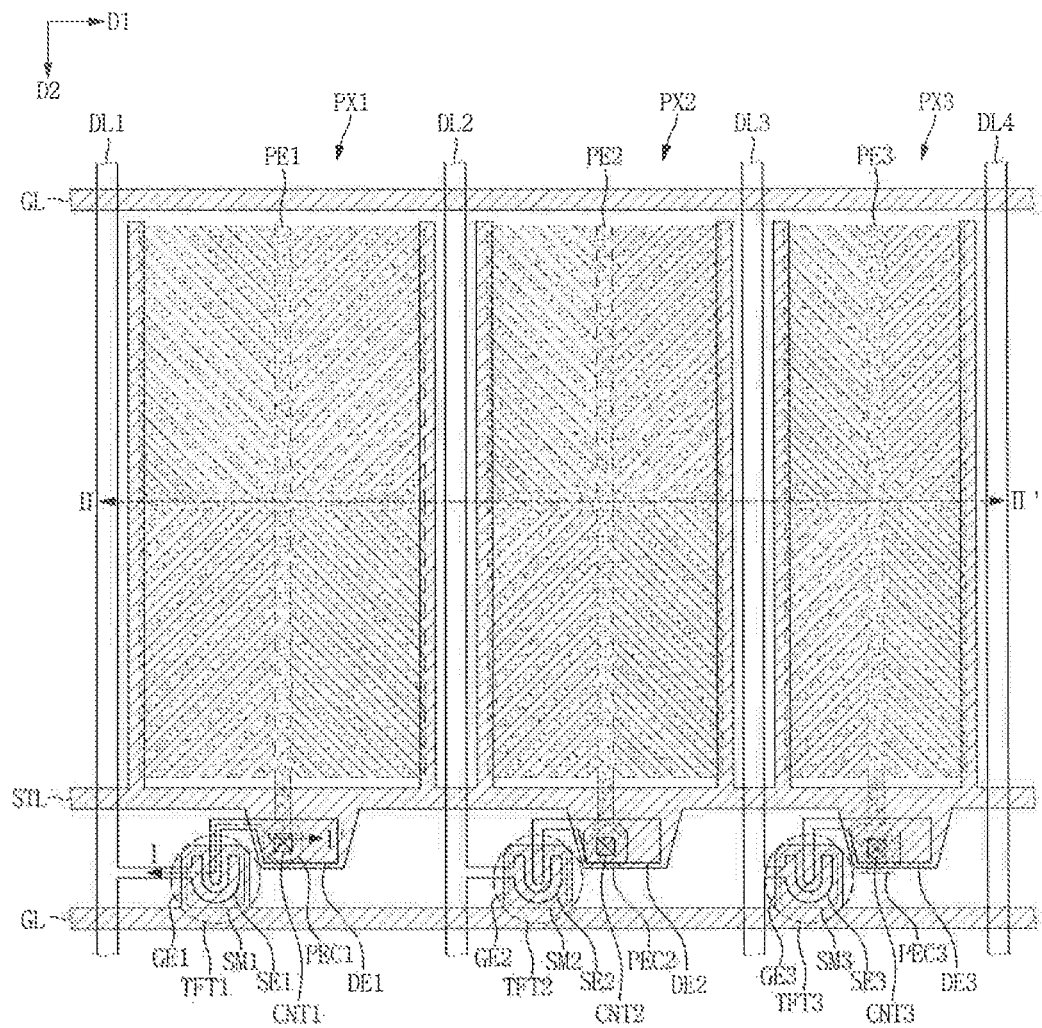
FIG. 3 is a plan view illustrating three adjacent pixels of FIG. 2 according to an exemplary embodiment.
Figure 4:
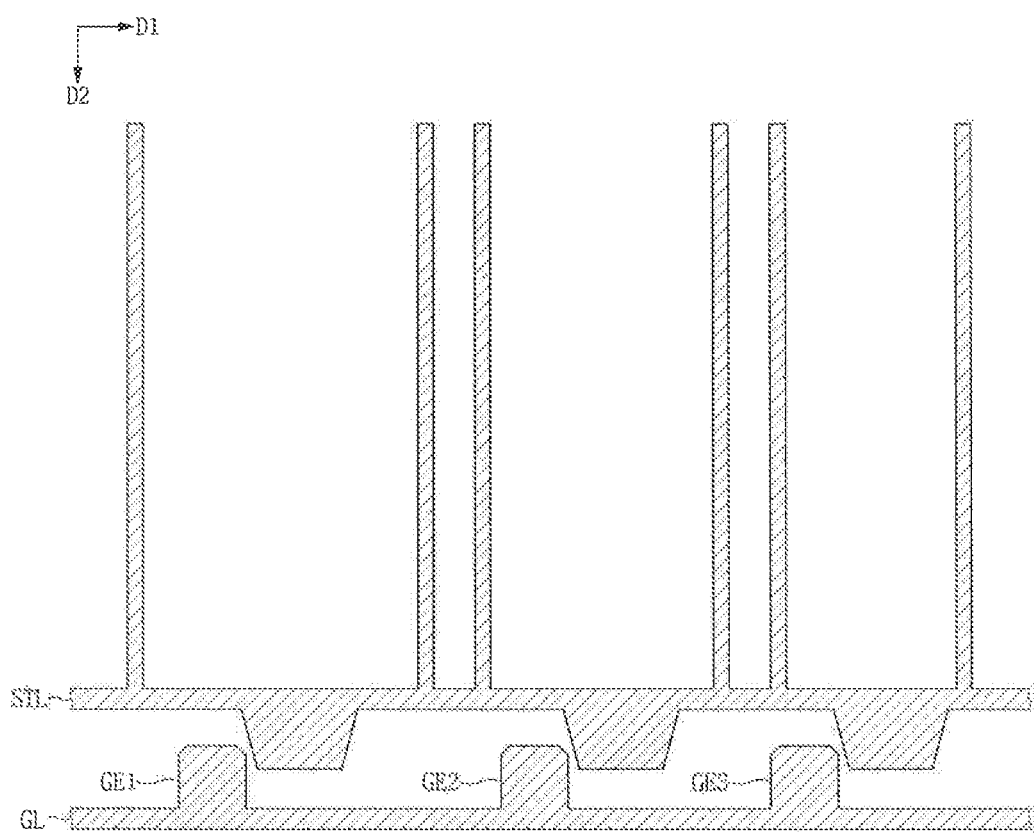
FIG. 4 is a plan view illustrating a gate wiring of FIG. 3 according to an exemplary embodiment of the present invention.
Figure 5:
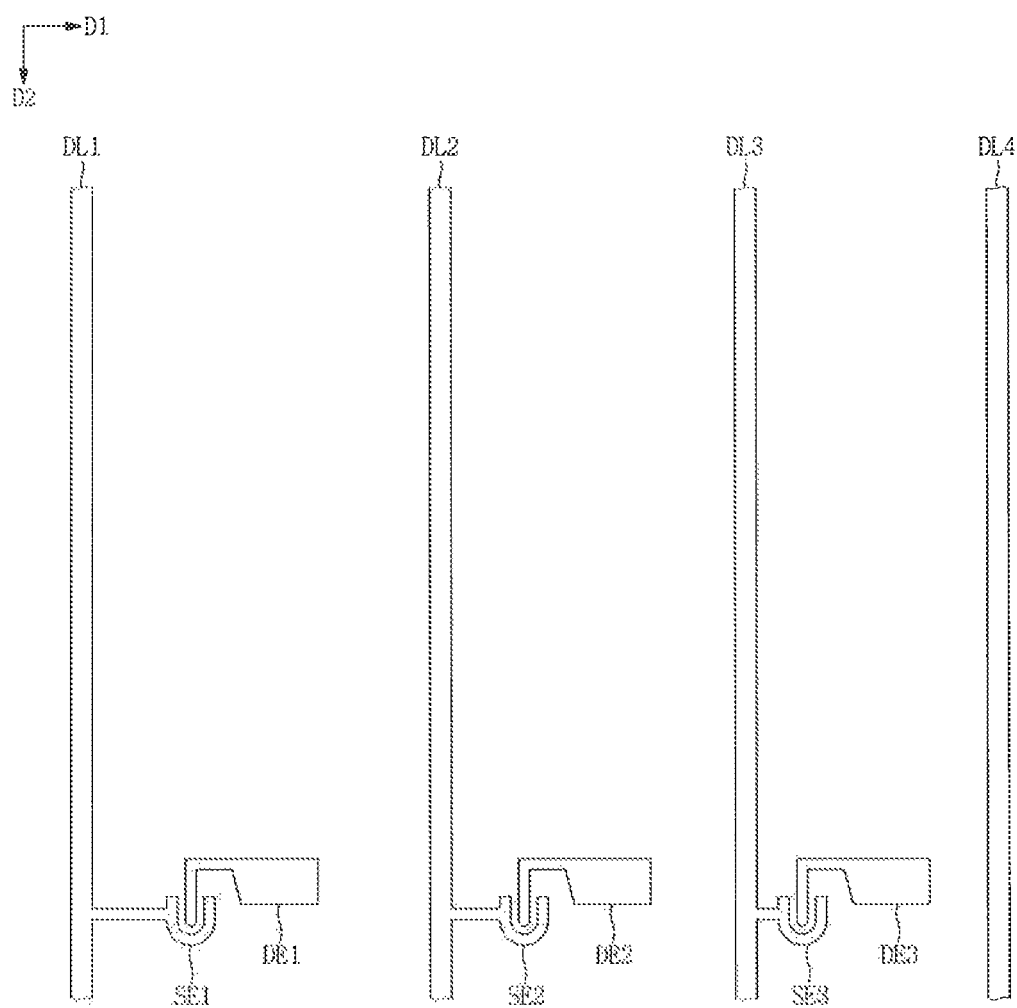
FIG. 5 is a plan view illustrating a data wiring of FIG. 3 according to an exemplary embodiment of the present invention.
Figure 6:
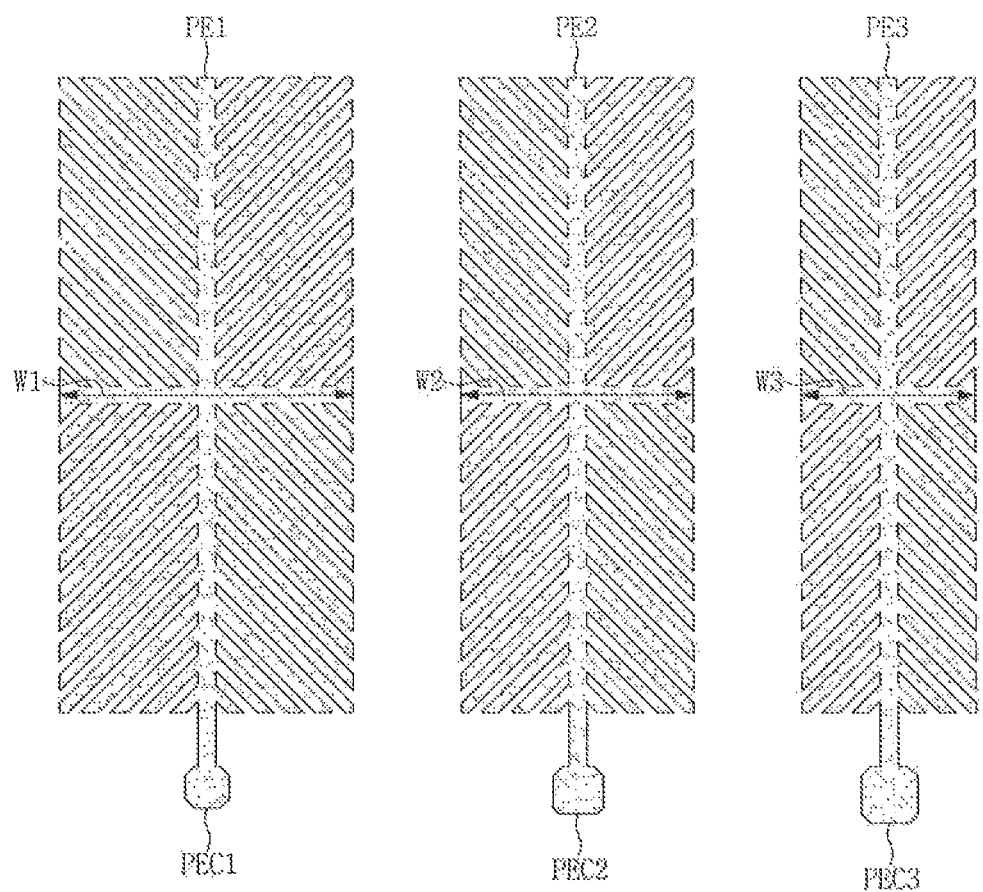
FIG. 6 is a plan view illustrating a pixel electrode of FIG. 3 according to an exemplary embodiment of the present invention.
Figure 7:
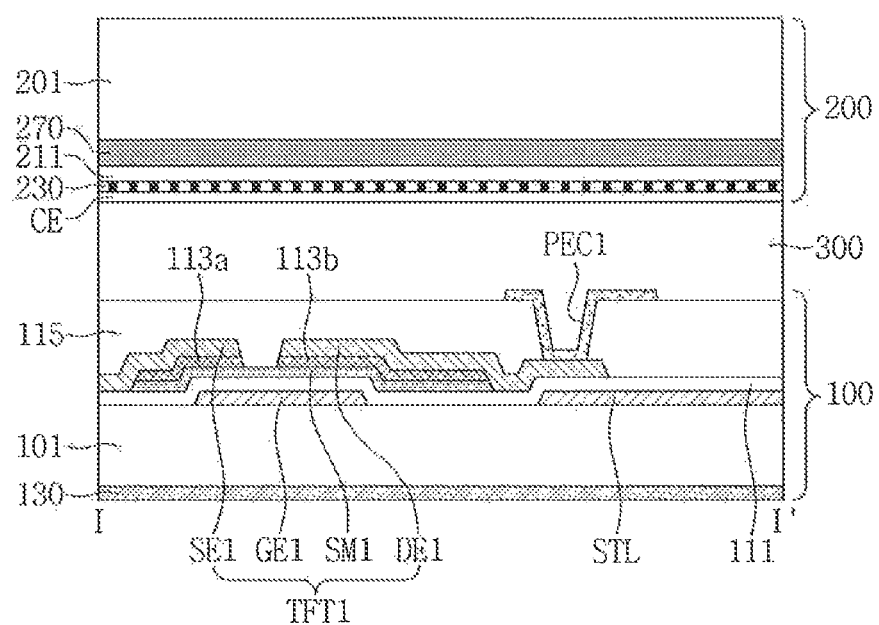
FIG. 7 is a cross-sectional view taken along a line I-I' of FIG. 3 according to an exemplary embodiment of the present invention.
Figure 8:
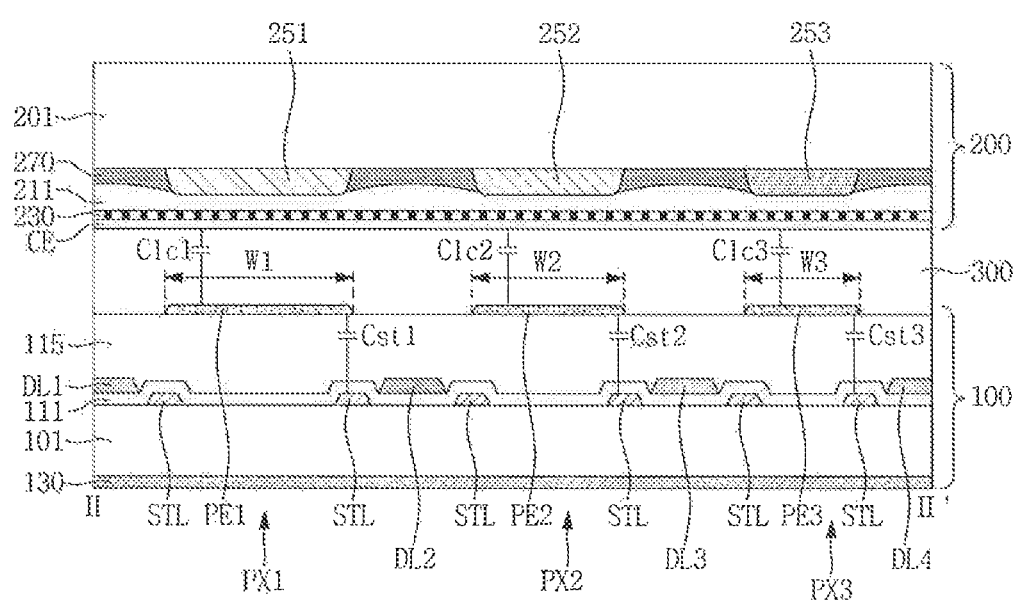
FIG. 8 is a cross-sectional view taken along a line II-II' of FIG. 3 according to an exemplary embodiment of the present invention.

FIG. 3 is a plan view illustrating three adjacent pixels of FIG. 2 according to an exemplary embodiment of the present invention. FIG. 4 is a plan view illustrating a gate wiring of FIG. 3 according to an exemplary embodiment of the present invention. FIG. 5 is a plan view illustrating a data wiring of FIG. 3 according to an exemplary embodiment of the present invention. FIG. 6 is a plan view illustrating a pixel electrode of FIG. 3 according to an exemplary embodiment of the present invention. FIG. 7 is a cross-sectional view taken along a line I-I' of FIG. 3 according to an exemplary embodiment of the present invention. FIG. 8 is a cross-sectional view taken along a line II-II' of FIG. 3 according to an exemplary embodiment of the present invention.

Referring to FIGS. 3, 4, 5, 6, 7 and 8, the display panel 10 according to an exemplary embodiment of the present invention may include the display substrate 100, the opposing substrate 200, and the light amount control layer 300. The light amount control layer 300 may be positioned between the display substrate 100 and the opposing substrate 200.

The display substrate 100 may include a first substrate 101, a gate line GL, a storage line STL, a plurality of data lines DL1, DL2, DL3 and DL4, first, second and third thin film transistors TFT1, TFT2 and TFT3, first, second and third pixel electrodes PE1, PE2 and PE3, a gate insulating layer 111, a protective layer 115, a first polarization plate 130, or the like. The first substrate 101 may include a first pixel PX1, a second pixel PX2, and a third pixel PX3. The first pixel PX1, the second pixel PX2, and the third pixel PX3 may each respectively display different colors. The gate line GL may be disposed on the first substrate 101. The gate line GL may extend in a first direction. The storage line STL may be spaced apart from the gate line GL. The data lines DL1 to DL4 may be disposed on the first substrate 101. The data lines DL1 to DL4 may extend in a second direction D2. The second direction D2 may intersect the first direction D1. The first, second, and third thin film transistors TFT1, TFT2, and TFT3 may be connected to the gate line GL. The first, second and third thin film transistors TFT1, TFT2, and TFT3 may be connected to the data lines DL1, DL2, and DL3, respectively. The first, second, and third pixel electrodes PE1, PE2, and PE3 may be connected to the first, second and third thin film transistors TFT1, TFT2, and TFT3, respectively.

The first pixel PX1 may display the color red, the second pixel PX2 may display the color green, and the third pixel PX3 may display the color blue. However, exemplary embodiments of the present invention are not limited thereto.

The first substrate 101 may include a transparent material such as glass or plastic.

A gate wiring may be disposed on the first substrate 101. The gate wiring may include the gate line GL, first, second and third gate electrodes GE1, GE2 and GE3, and a storage line STL. The gate line GL may extend in the first direction D1. The first, second and third gate electrodes GE1, GE2, and GE3 may branch from the gate line GL. The storage line STL may be spaced apart from the gate line GL.

The storage line STL may extend in the first direction D1 and the second direction D2. The second direction D2 may intersect the first direction D1. The storage line STL may externally receive a DC voltage. The storage line STL may, for example, at least partially overlap the first, second and third pixel electrodes PE1, PE2 and PE3. Thus, a storage capacitance Cst may be formed between the first, second and third pixel electrodes PE1, PE2 and PE3 and the storage line STL.

The gate wiring may include aluminum (Al) or alloys thereof, silver (Ag) or alloys thereof, copper (Cu) or alloys thereof and/or molybdenum (Mo) or alloys thereof. In addition, the gate wiring may include chromium (Cr), tantalum (Ta), or titanium (Ti). According to an exemplary embodiment of the present invention, the gate wiring may have a multi-layered structure. The multi-layered structure may include at least two conductive layers. The at least two conductive layers may have different physical properties from each other.

The gate insulating layer 111 may be disposed on substantially an entire surface of the first substrate 101 on which the gate wiring is disposed. The gate insulating layer 111 may include silicon nitride (SiNx), or silicon oxide (SiOx). According to an exemplary embodiment of the present invention, the gate insulating layer 111 may have a multi-layered structure. The multi-layered structure may include at least two insulating layers. The at least two insulating layers may have different physical properties from each other.

The first, second and third semiconductor layers SM1, SM2 and SM3 may be disposed on the gate insulating layer 111.

The first, second and third semiconductor layers SM1, SM2 and SM3 may respectively overlap the first, second and third gate electrodes GE1, GE2 and GE3 may be positioned below the gate insulating layer 111. The first, second and third semiconductor layers SM1, SM2 and SM3 may each include amorphous silicon, or polycrystalline silicon.

A data wiring may be disposed on the first, second and third semiconductor layers SM1, SM2 and SM3. The data wiring may be disposed on the first, second and third data lines DL1, DL2 and DL3. The first, second and third data lines DL1, DL2, and DL3 may extend in a second direction D2. The second direction D2 may intersect the first direction D1. The data wiring may be disposed on first, second and third source electrodes SE1, SE2 and SE3. The first, second and third source electrodes SE1, SE2 and SE3 may branch from the first, second and third data lines DL1, DL2 and DL3, respectively. The data wiring may be disposed on first, second and third drain electrodes DE1, DE2 and DE3. The first, second and third drain electrodes DE1, DE2 and DE3 may be spaced apart from the first, second and third source electrodes SE1, SE2 and SE3, respectively.

Ohmic contact layers 113a and 113b may be disposed on the semiconductor layers SM1, SM2 and SM3 and the source electrodes SE1, SE2 and SE3. The ohmic contact layers 113a and 113b may be disposed on the semiconductor layers SM1, SM2 and SM3 and the drain electrodes DE1, DE2 and DE3. The ohmic contact layers 113a and 113b may include silicide or n+ hydrogenated amorphous silicon. The n+ hydrogenated amorphous silicon may be doped with n-type impurity ions, e.g., phosphorus (P). The n+ hydrogenated amorphous silicon may be doped with n-type impurity ions at a relatively high concentration.

The data wiring may include a same material as a material included in the gate wiring.

The first thin film transistor TFT1 may include the first gate electrode GE1, the first semiconductor layer SM1, the first source electrode SE1, and the first drain electrode DE1. The second thin film transistor TFT2 may include the second gate electrode GE2, the second semiconductor layer SM2, the second source electrode SE2, and the second drain electrode DE2. The third thin film transistor TFT3 may include the third gate electrode GE3, the third semiconductor layer SM3, the third source electrode SE3, and the third drain electrode DE3.

The protective layer 115 may be positioned above the first substrate 101. For example, the protective layer 115 may be positioned above substantially an entire surface of the first substrate 101. The first, second and third thin film transistors TFT1, TFT2 and TFT3 may be formed on the first substrate 101. The protective layer 115 may include an inorganic insulating material such as silicon nitride (SiNx) or silicon oxide (SiOx).

The first, second and third pixel electrodes PE1, PE2 and PE3 may be disposed on the protective layer 115. In an exemplary embodiment of the present invention, the first, second and third pixel electrodes PE1, PE2 and PE3 may be connected to the first, second and third drain electrodes DE1, DE2 and DE3 through contact holes CNT1, CNT2 and CNT3 of the protective layer 115, respectively. Structures branching from the first, second and third pixel electrodes PE1, PE2 and PE3 connecting the first, second and third pixel electrodes PE1, PE2 and PE3 to the first, second and third drain electrodes DE1, DE2 and DE3 may be referred to as first, second and third pixel electrode contact portions PEC1, PEC2 and PEC3, respectively.

The first, second and third pixel electrodes PE1, PE2 and PE3 and the first, second and third pixel electrode contact portions PEC1, PEC2 and PEC3 may each include a transparent conductive material such as indium tin oxide (ITO) or indium zinc oxide (IZO). In an exemplary embodiment of the present invention, ITO may be a polycrystalline or monocrystalline material. IZO may be a polycrystalline or monocrystalline material.

When the first pixel PX1 displays red, the second pixel PX2 may display green and the third pixel PX3 may display blue. The first, second and third pixel electrodes PE1, PE2 and PE3 of the first, second and third pixels PX1, PX2 and PX3 may have different sized areas from each other.

For example, the first pixel electrode PE1 may have a larger area than an area of the second pixel electrode PE2. The second pixel electrode PE2 may have a larger area than an area of the third pixel electrode PE3.

Each of the first, second and third pixel electrodes PE1, PE2 and PE3 may have different areas, for example, according to an energy rate required for implementing target chromatic coordinates, a light conversion ratio of first, second and third light conversion units 251, 252 and 253.

For example, the first pixel electrode PE1 of the first pixel PX1 displaying red may have a relatively small energy conversion efficiency. The first pixel electrode PE1 of the first pixel PX1 may have a largest area of the first, second and third pixel electrodes PE1, PE2 and PE3. The third pixel electrode PE3 of the third pixel PX3 displaying blue may have a relatively large energy conversion efficiency. The third pixel electrode PE3 of the third pixel PX3 may have a smallest area of the first, second and third pixel electrodes PE1, PE2 and PE3. An area ratio of the first, second and third pixel electrodes PE1, PE2 and PE3 may be about 1.1 to 1.3:1:0.7 to 0.9.

When the first, second and third pixel electrodes PE1, PE2 and PE3 may each have substantially a same length as each other in the second direction D2, the first, second and third pixel electrodes PE1, PE2 and PE3 may have different widths in the first direction D1 from each other. When a width of the first pixel electrode PE1 in the first direction D1 is referred to as a width W1, a width of the second pixel electrode PE2 in the first direction D1 may be referred to as a width W2. Additionally, a width of the third pixel electrode PE3 in the first direction D1 may be referred to as a width W3. Thus, the width W1, the width W2 and the width W3 may have a width ratio of about 1.1 to 1.3:1:0.7 to 0.9.

In an exemplary embodiment of the present invention, as the areas of the first, second and third pixel electrodes PE1, PE2 and PE3 are different from each other, liquid crystal capacitances Clc1, Clc2 and Clc3 of the first, second and third pixel electrodes PE1, PE2 and PE3 and a common electrode CE may vary from each other. Thus, kickback voltages of respective ones of the pixels PX1, PX2 and PX3 may vary from each other. In order to substantially reduce or prevent the kickback voltages or the lick of the respective ones of the pixels PX1, PX2, or PX3 from varying from each other, a difference among the liquid crystal capacitances Clc1, Clc2 and Clc3 may be compensated using a storage capacitance Cst of each of the pixels PX1, PX2 and PX3. Thus, respective total capacitances of the pixels PX1, PX2 and PX3 may be substantially equal to each other.

Thus, the storage capacitances Cst of the first, second and third pixels PX1, PX2 and PX3 may vary from each other. For example, a storage capacitance Cst1 of the first pixel PX1 may be less than a storage capacitance Cst2 of the second pixel PX2. The storage capacitance Cst2 of the second pixel PX2 may be less than the storage capacitance Cst3 of the third pixel PX3.

Accordingly, an overlap area between the first pixel electrode PE1 and the storage line STL may be less than an overlap area between the second pixel electrode PE2 and the storage line STL. Additionally, the overlap area between the second pixel electrode PE2 and the storage line ST may be less than an overlap area between the third pixel electrode PE3 and the storage line STL.

The overlap areas of the first, second and third pixel electrodes PE1, PE2 and PE3 and the storage line STL may be imparted by, for example, varying areas of the first, second and third pixel electrode contact portions PEC1, PEC2 and PEC3. Thus, the first pixel electrode contact portion PEC1 may have a less area than an area of the second pixel electrode contact portion PEC2. The second pixel electrode contact portion PEC2 may have an area less than an area of the third pixel electrode contact portion PEC3.

The first polarization plate 130 may be disposed on a rear surface of the first substrate 101.

The opposing substrate 200 may include a second substrate 201, a first light conversion unit 251, a second light conversion unit 252, a third light conversion unit 253, a black matrix 270, a planarization layer 211, a second polarization plate 230, and a common electrode CE.

The second substrate 201 may include a transparent material such as glass or plastic.

The first, second, and third light conversion units 251, 252 and 253 may be disposed on the second substrate 201. The first light conversion unit 251 may be in a position along a direction orthogonal to an upper surface of the first substrate corresponding to the first pixel electrode PE1. The second light conversion unit 252 may be in a position along a direction orthogonal to an upper surface of the first substrate corresponding to the second pixel electrode PE2. The third light conversion unit 253 may be in a position along a direction orthogonal to an upper surface of the first substrate corresponding to the third pixel electrode PE3.

The first light conversion unit 251, the second light conversion unit 252 and the third light conversion unit 253 may have a stripe shape. The stripe shape may extend in the second direction D2 on a plane. Alternatively, the first light conversion unit 251, the second light conversion unit 252 and the third light conversion unit 253 may have an island shape.

The first light conversion unit 251 may include a red phosphor. The second light conversion unit 252 may include a green phosphor. The third light conversion unit 253 may include at least one of a blue phosphor or a scattering element.

The red, green and blue phosphors may convert wavelength of light to output a light of a specific wavelength. The wavelength of the output light may vary, for example, depending on a size of the phosphor. Thus, light having different wavelengths may be output according to the diameter of the phosphor.

The phosphor may have a diameter ranging from about 2 nm to about 13 nm. When the phosphor has a relatively small diameter, the wavelength of the output light may be shortened and the phosphor may output a blue-based light. When the diameter of the phosphor increases, the wavelength of the output light may be lengthened and the phosphor may output red-based light.

For example, a phosphor having a diameter of about 10 nm may output red light. A phosphor having a diameter of about 7 nm may output green light. A phosphor having a diameter of about 5 nm may output blue light. A phosphor outputting red light may be referred to as a red phosphor. A phosphor outputting green light may be referred to as a green phosphor. A phosphor outputting blue light may be referred to as a blue phosphor.

The phosphor may include at least one of a quantum dot, a quantum rod, or a tetrapod quantum dot.

Since the quantum dot may have a relatively high quantum yield and a relatively high extinction coefficient as compared to fluorescent dyes, the quantum dot may generate a relatively intense fluorescent light. As an example, the quantum dot may absorb a light of a relatively short wavelength and may output a light of a longer wavelength.

The quantum dot may include a core nanocrystal and a shell nanocrystal. The shell nanocrystal may surround the core nanocrystal. The quantum dot may include an organic ligand and an organic coating layer. The organic ligand may be bonded to the shell nanocrystal. The organic coating layer may surround the shell nanocrystal.

The shell nanocrystal may have two or more layers. The shell nanocrystal may be formed on a surface of the core nanocrystal.

The quantum dot may include at least one substance of group II compound semiconductors, group III compound semiconductors, group V compound semiconductors or group VI compound semiconductors. For example, the core nanocrystal forming the quantum dot particle may include at least one of: CdSe, CdS, CdTe, ZnS, ZnSe, ZnTe, CdSeTe, CdZnS, CdSeS, PbSe, PbS, PbTe, AgInZnS, HgS, HgSe, HgTe, GaN, GaP, GaAs, InP, InZnP, InGaP, InGaN, InAs or ZnO. In addition, the shell nanocrystal may include at least one of: CdS, CdSe, CdTe, CdO, ZnS, ZnSe, ZNSeS, ZnTe, ZnO, InP, InS, GaP, GaN, GaO, InZnP, InGaP, InGaN, InZnSCdSe, PbS, TiO, SrSe or HgSe.

For example, when the core nanocrystal includes CdSe, blue light may be emitted when a diameter of the quantum dot is in a range of from about 1 nm to about 3 nm. Green light may be emitted when the diameter of the quantum dot is in a range of from about 3 nm to about 5 nm. Red light may be emitted when the diameter of the quantum dot is in a range of from about 7 nm to about 10 nm.

The green phosphor may output a light having a wavelength ranging from about 500 nm to about 580 nm. The green phosphor may include at least one of: a zinc silicon oxide-based phosphor doped with manganese (e.g., $Zn_2SiO_4:Mn$), a strontium gallium sulfide-based phosphor doped with europium (e.g., $SrGa_2S_4:Eu$), or a barium silicon oxide chloride-based phosphor doped with europium (e.g., $Ba_5Si_2O_7Cl_4:Eu$). For example, the green phosphor may include at least one selected from: $YBO_3:Ce,Tb$, $BaMgAl_{10}O_{17}:Eu,Mn$, $(Sr,Ca,Ba)(Al,Ga)_2S_4:Eu$, $ZnS:Cu,Al$ $Ca_8Mg(SiO_4)_4Cl_2:Eu,Mn$, $Ba_2SiO_4:Eu$, $(Ba,Sr)_2SiO_4:Eu$, $Ba_2(Mg,Zn)Si_2O_7:Eu$, $(Ba,Sr)Al_2O_4:Eu$, $Sr_2Si_3O_8.2SrCl_2:Eu$, $(Sr,Ca,Ba,Mg)P_2O_7N_8:Eu,Mn$, $(Sr,Ca,Ba,Mg)_3P_2O_8:Eu,Mn$, $Ca_3Sc_2Si_3O_{12}:Ce$, $CaSc_2O_4:Ce$, b-SiAlON:Eu, $Ln_2Si_3O_3N_4:Tb$ or $(Sr,Ca,Ba)Si_2O_2N_2:Eu$.

The red phosphor may output a light having a wavelength ranging from about 580 nm to about 670 nm. The red phosphor may include at least one selected from: a nitride-based red phosphor, a fluoride-based red phosphor, a silicate-based red phosphor, a sulfide-based red phosphor, a selenide-based red phosphor, an oxynitride-based red phosphor, a molybdate-based red phosphor, a tantalate-based red phosphor, carbido-nitride, a tungstate-based red phosphor, $Sr_2MgAl_{22}O_{36}:Mn^{4+}$, $(Ba,Sr,Ca)_2MgAl_{16}O_{27}:Eu^{2+,}$ $(Ba,Sr,Ca)_2MgAl_{16}O_{27}:Mn^{2+}$, $Sr_4Al_{14}O_{460}:Eu^{2+}$ or $Mg_4O_{5.5}GeF:Mn^{4+}$.

For example, the nitride-based red phosphor may include at least one selected from: $(Sr,Ca)AlSiN_3:Eu$, $(Sr,Ca)AlSi(ON)_3:Eu$, $(Sr,Ca)_2Si_5N_8:Eu$, $(Sr,Ca)_2Si_5(ON)_8:Eu$, $(Sr,Ba)SiAl_4N_7:Eu$, CaAlSiN3:Eu2+, (Sr,Ca)AlSiN3:Eu2+ or Sr2Si5N8:Eu2.

The fluoride-based red phosphor may include at least one selected from: $K2SiF6:Mn^{4+}$, $K2TiF6:Mn^{4+}$, $ZnSiF6:Mn^{4+}$, $Na2SiF6:Mn^{4+}$ or $Mg4O5.5GeF:Mn^{4+}$.

The molybdate-based red phosphor may include at least one of: $LiLa1-xEuxMo_2O_8$ or $LiEuMo_2O_8$. The tantalate-based red phosphor may include $K(Gd,Lu,Y)Ta_2O_7:Eu^{3+}$.

The carbido-nitrides may include $Cs(Y,La,Gd)Si(CN_2)_4$:Eu.

The tungstate-based red phosphor may include at least one selected from: $Gd2WO6:Eu^{3+}$, $Gd2W2O9:Eu^+$, $(Gd,La)2W3O12:Eu^{3+}$, $La2W3O12:Eu^{3+}$, $La2W3O12:Sm^{3+}$ or $LiLaW2O8:Eu^{3+}$.

The scattering element may include at least one of: silica, titanium oxide (TiO2), zirconium oxide (ZrO2), acrylic beads, styrene-acryl beads, melamine beads, polystyrene, polymethylmethacrylate, polyurethane, polycarbonate beads, polyvinyl chloride beads, silicone-based particles, or air pores. The scattering element may have a hollow shape.

The black matrix 270 may be disposed at sides of the first light conversion unit 251, the second light conversion unit 252 and the third light conversion unit 253. For example, the black matrix 270 may be located between each of the first light conversion unit 251 and the second light conversion unit 252, the second light conversion unit 252 and the third light conversion unit 253, and the third light conversion unit 253 and the first light conversion unit 251. The black matrix 270 may substantially reduce or prevent a light passing through one light conversion unit from being incident to another light conversion unit. Thus, the black matrix 270 may substantially reduce or prevent color mixing.

The black matrix 270 may include a non-photosensitive organic material. In such an exemplary embodiment of the present invention, the black matrix 270 may include a material soluble in a developer. However, exemplary embodiments of the present invention are not limited thereto. For example, the black matrix 270 may include a photosensitive organic material.

The planarization layer 211 may be disposed on the first light conversion unit 251, the second light conversion unit 252, the third light conversion unit 253 and the black matrix 270. The planarization layer 211 may planarize an uneven surface. The planarization layer 211 may substantially prevent elution of impurities.

The second polarization plate 230 may be disposed on the planarization layer 211. A transmission axis of the second polarization plate 230 and a transmission axis of the first polarization plate 130 may be orthogonal to each other. One of the transmission axes of the first polarization plate 130 and the second polarization plate 230 may be substantially parallel to the gate line GL.

The second polarization plate 230 may include a polarizer. The polarizer may include a plurality of line patterns. The plurality of line patterns may be substantially parallel to the planarization layer 211. Each line pattern may have a straight line shape extending in one direction. Each line pattern may have a predetermined width. Each line pattern may be spaced apart from each other line pattern by a predetermined interval.

The line pattern may include a metal. The polarizer including the plurality of metal line patterns may be referred to as a wire grid polarizer (WGP). The line pattern may include at least one of, for example, aluminum (Al), gold (Au), silver (Ag), copper (Cu), chromium (Cr), iron (Fe) or nickel (Ni).

The polarizer may be formed by an imprinting method using a mold or a photolithography method. However, exemplary embodiments of the present invention are not limited thereto. For example, the polarizer may be formed using a block copolymer.

The common electrode CE may be disposed on the second polarization plate 230.

The common electrode CE may be a whole plate electrode including a transparent conductor such as indium tin oxide (ITO) or indium zinc oxide (IZO). However, exemplary embodiments of the present invention are not limited thereto. For example, the common electrode CE may have a concave-convex shape and at least one slit for defining a plurality of domains.

An alignment layer may be positioned between the pixel electrodes PE1, PE2 and PE3 and the light amount control layer 300. The alignment layer may be disposed between the light amount control layer 300 and the common electrode CE.

The light amount control layer 300 may be a liquid crystal layer. The liquid crystal layer may include liquid crystal molecules. The liquid crystal molecules may have a negative dielectric constant and may be vertically aligned.

Figure 9:
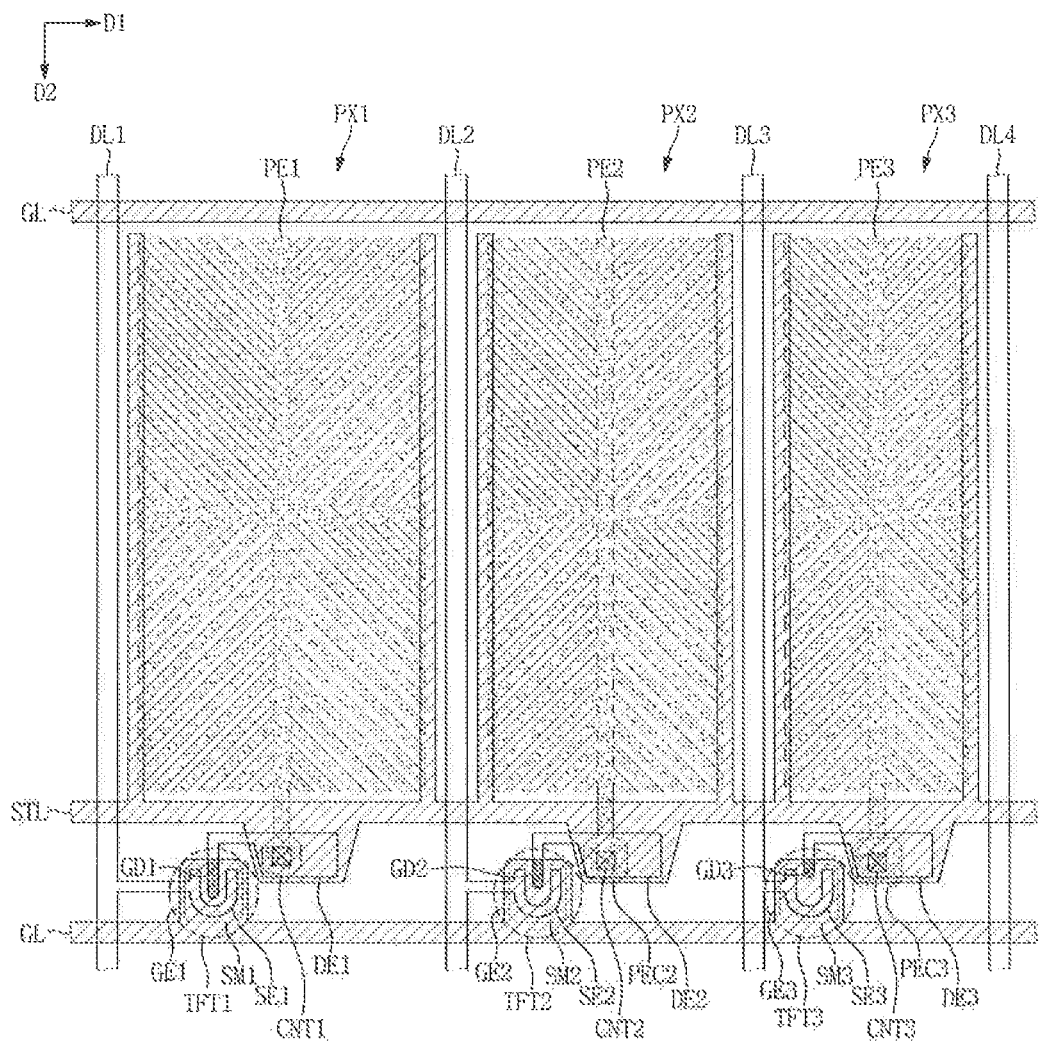
FIG. 9 is a plan view illustrating a display device according to an exemplary embodiment of the present invention.

FIG. 9 is a plan view illustrating a display device according to an exemplary embodiment of the present invention. The descriptions of the display device according to the exemplary embodiment previously described may be omitted from the following description.

Referring to FIG. 9, the display device may include a first pixel PX1, a second pixel PX2 and a third pixel PX3. The first pixel PX1, the second pixel PX2 and the third pixel PX3 may display different colors from each other. The first pixel PX1 may display red, the second pixel PX2 may display green and the third pixel PX3 may display blue; however, exemplary embodiments of the present invention are not limited thereto.

The first pixel PX1 may include a first thin film transistor TFT1 and a first pixel electrode PE1. The first pixel electrode PE1 may be connected to the first thin film transistor TFT1. The second pixel PX2 may include a second thin film transistor TFT2 and a second pixel electrode PE2. The second pixel electrode PE2 may be connected to the second thin film transistor TFT2. The third pixel PX3 may include a third thin film transistor TFT3 and a third pixel electrode PE3. The third pixel electrode PE3 may be connected to the third thin film transistor TFT3.

The first, second and third pixel electrodes PE1, PE2 and PE3 according to an exemplary embodiment of the present invention may have different sized areas from each other. For example, the first pixel electrode PE1 may have a larger area than an area of the second pixel electrode PE2. The second pixel electrode PE2 may have a larger area than an area of the third pixel electrode PE3.

Each of the first, second and third pixel electrodes PE1, PE2 and PE3 may have different areas, for example, according to an energy rate used for implementing target chromatic coordinates, or a light conversion ratio of first, second and third light conversion units 251, 252 and 253. For example, an area ratio of the first, second and third pixel electrodes PE1, PE2 and PE3 may be about 1.1 to 1.3:1:0.7 to 0.9.

According to an exemplary embodiment of the present invention, as the areas of the first, second and third pixel electrodes PE1, PE2 and PE3 are different from each other, liquid crystal capacitances Clc1, Clc2 and Clc3 between the first, second and third pixel electrodes PE1, PE2 and PE3 and a common electrode CE, respectively, may vary from each other. Thus, kickback voltages vk of the respective ones of the pixels PX1, PX2 and PX3 may vary from each other.

The kickback voltage Vk may be inversely proportional to each of the liquid crystal capacitances Clc1, Clc2 and Clc3 of the pixels PX1, PX2 and PX3 as shown in Equation 1. Thus, when the respective areas of the pixel electrodes PE1, PE2 and PE3 are different from each other, the respective kickback voltages Vk of the pixels PX1, PX2 AND PX3 may vary from each other.

$$Vk = \frac{Cgd}{Clc + Cst + Cgd} Vg \qquad \text{[Equation 1]}$$

Accordingly, by compensating the difference among the respective kickback voltages Vk of the pixels PX1, PX2 and PX3, respectively, using a capacitance Cgd among the gate electrodes GE1, GE2 and GE3 and the drain electrodes DE1, DE2 and DE3, the respective kickback voltages Vk of the pixels PX1, PX2 and PX3 may be substantially equal.

Thus, the capacitances Cgd between the gate electrodes GE1, GE2 and GE3 and the drain electrodes DE1, DE2 and DE3 of the respective pixels PX1, PX2 and PX3 may vary from each other. For example, a capacitance Cgd1 between the first gate electrode GE1 and the first drain electrode DE may be greater than a capacitance Cgd2 between the second gate electrode GE2 and the second drain electrode DE2. The capacitance Cgd2 between the second gate electrode GE2 and the second drain electrode DE2 may be greater than a capacitance Cgd3 between the third gate electrode GE3 and the third drain electrode DE3.

Accordingly, an overlap area GD1 between the first gate electrode GE1 and the first drain electrode DE1 may be larger than an overlap area GD2 between the second gate electrode GE2 and the second drain electrode DE2. The overlap area GD2 between the second gate electrode GE2 and the second drain electrode DE2 may be larger than an overlap area GD3 between the third gate electrode GE3 and the third drain electrode DE3.

Figure 10:
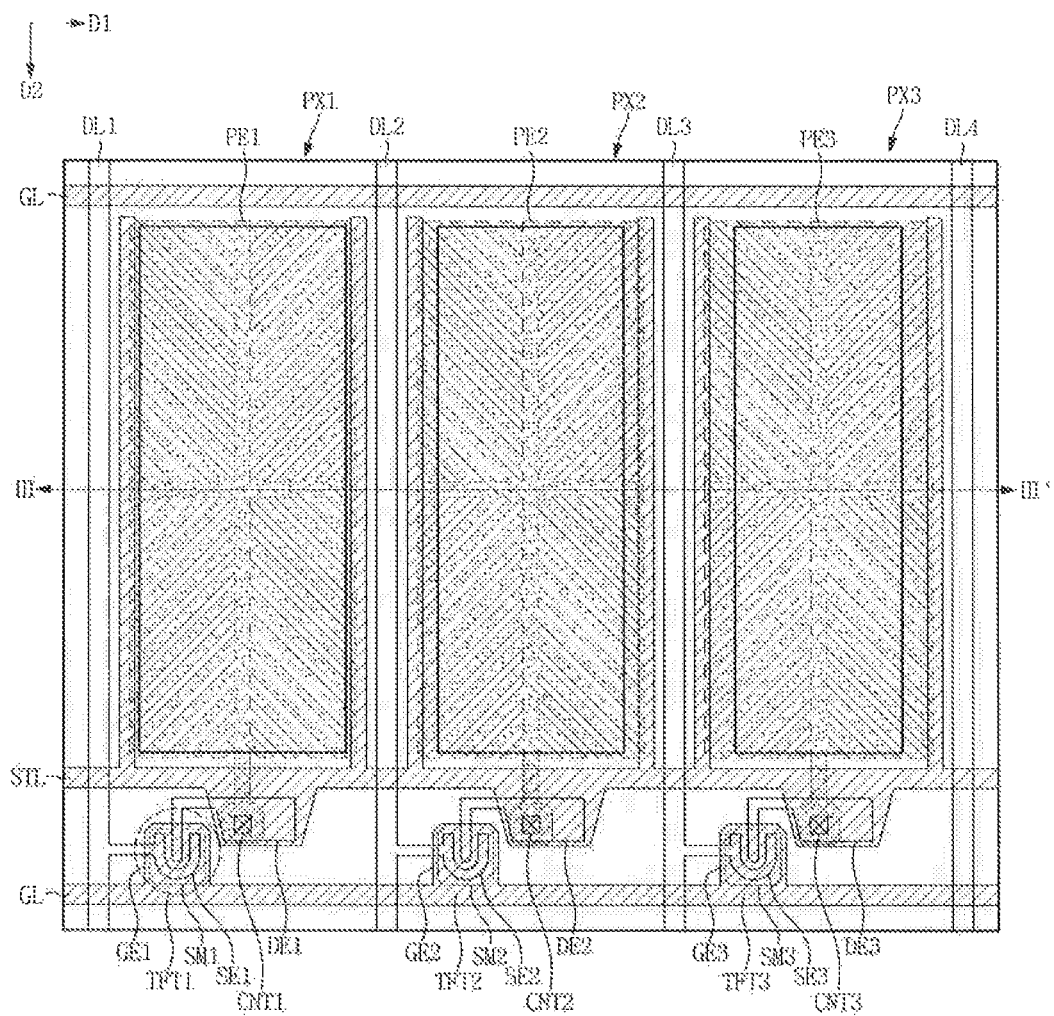
FIG. 10 is a plan view illustrating a display device according to an exemplary embodiment of the present invention.
Figure 11:
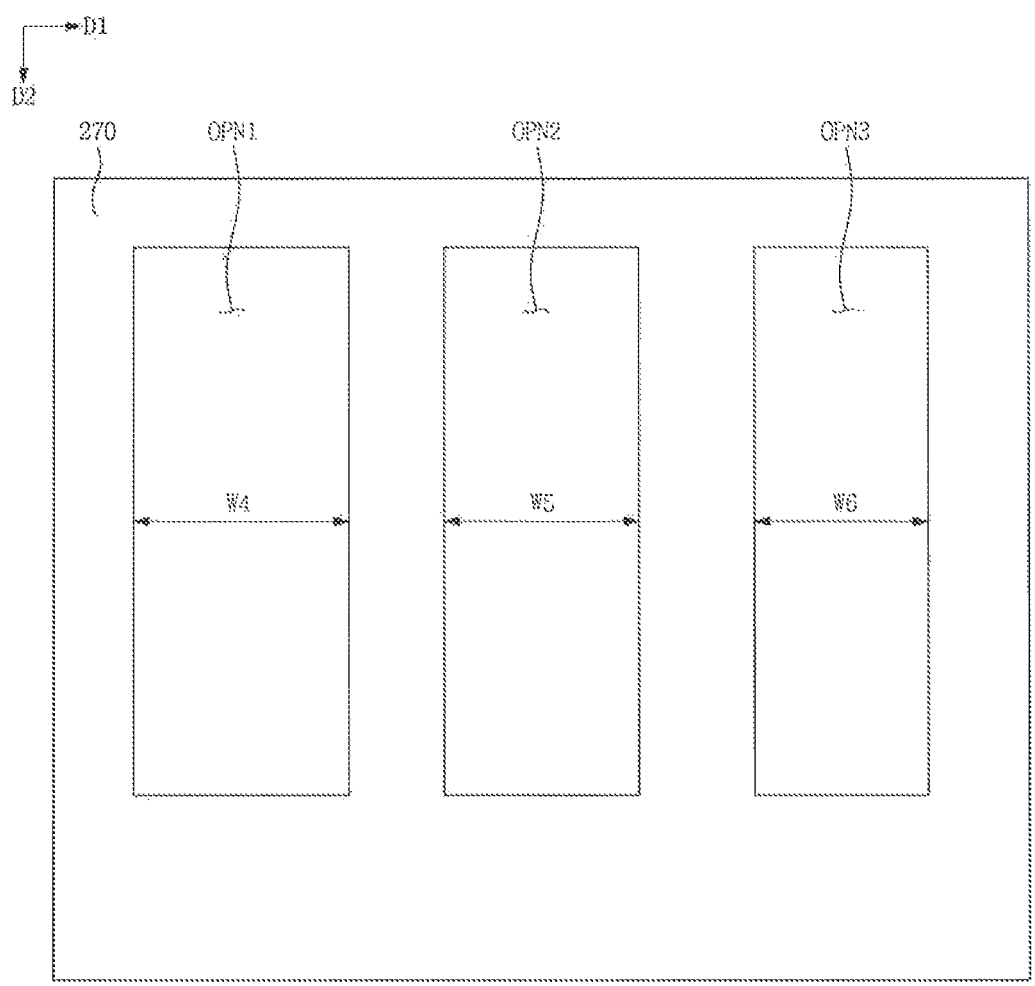
FIG. 11 is a plan view illustrating a black matrix of FIG. 10 according to an exemplary embodiment of the present invention.
Figure 12:
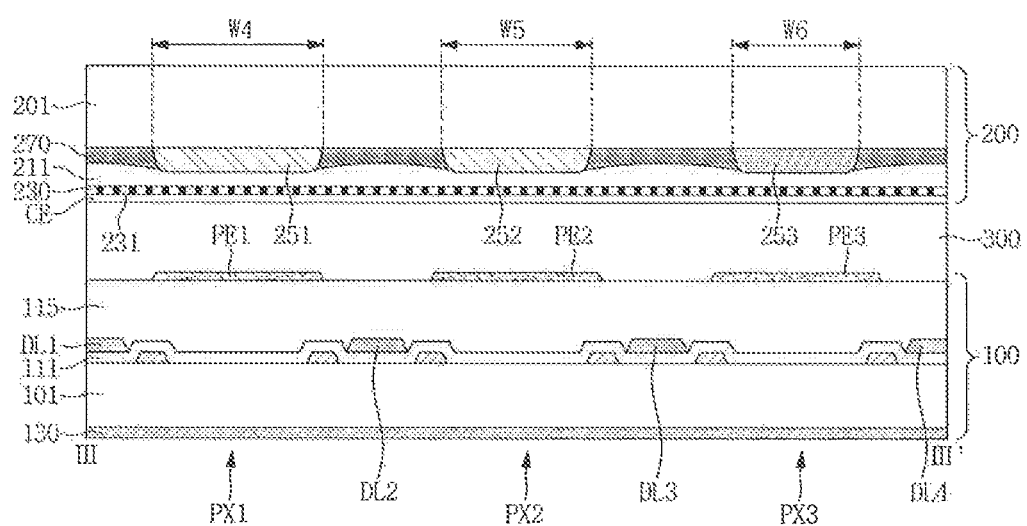
FIG. 12 is a cross-sectional view taken along a line III-III' of FIG. 10 according to an exemplary embodiment of the present invention.

FIG. 10 is a plan view illustrating a display device according to an exemplary embodiment of the present invention. FIG. 11 is a plan view illustrating a black matrix of FIG. 10 according to an exemplary embodiment of the present invention. FIG. 12 is a cross-sectional view taken along a line III-III' of FIG. 10 according to an exemplary embodiment of the present invention. The descriptions of the display device according to the exemplary embodiment of the present invention previously described may be omitted from the following description.

Referring to FIGS. 10, 11 and 12, the display device according to an exemplary embodiment of the present invention may include a display substrate 100, an opposing substrate 200 and a light amount control layer 300. The light amount control layer may be positioned between the display substrate 100 and the opposing substrate 200.

The display substrate 100 may include a first pixel PX1, a second pixel PX2 and a third pixel PX3. The first pixel PX1, the second pixel PX2 and the third pixel PX3 may display different colors from each other. The first pixel PX1 may display red, the second pixel PX2 may display green and the third pixel PX3 may display blue; however, exemplary embodiments of the present invention are not limited thereto.

The first pixel PX1 may include a first thin film transistor TFT1 and a first pixel electrode PE1. The first pixel electrode PE1 may be connected to the first thin film transistor TFT1. The second pixel PX2 may include a second thin film transistor TFT2 and a second pixel electrode PE2. The second pixel electrode PE2 may be connected to the second thin film transistor TFT2. The third pixel PX3 may include a third thin film transistor TFT3 and a third pixel electrode PE3. The third pixel electrode PE3 may be connected to the third thin film transistor TFT3.

The first, second and third pixel electrodes PE1, PE2 and PE3 may have substantially a same area as each other.

The opposing substrate 200 may include a second substrate 201, a first light conversion unit 251, a second light conversion unit 252, a third light conversion unit 253, a black matrix 270, a planarization layer 211, a second polarization plate 230, and a common electrode CE.

The black matrix 270 may include a first opening OPN1, a second opening OPN2 and a third opening OPN3. The first opening OPN1 may be defined corresponding to the first pixel electrode PE1. The second opening OPN2 may be defined corresponding to the second pixel electrode PE2. The third opening OPN3 may be defined corresponding to the third pixel electrode PE3.

The first opening OPN1, the second opening OPN2 and the third opening OPN3 may have different areas from each other. For example, the first opening OPN1 may have a larger area than an area of the second opening OPN2. The second opening OPN2 may have a larger area than an area of the third opening OPN3.

The first opening OPN1, the second opening OPN2 and the third opening OPN3 may be defined, for example, according to an energy rate required for implementing target chromatic coordinates, a light conversion ratio of first, second and third light conversion units 251, 252 and 253, or the like. For example, the first opening OPN1 corresponding to the first pixel PX1 displaying red may have a relatively small energy conversion efficiency. The first opening OPN1 corresponding to the first pixel PX1 may have a largest area of the first opening OPN1, the second opening OPN2 and the third opening OPN3. The third opening OPN3 corresponding to the third pixel PX3 displaying blue may have a relatively large energy conversion efficiency. The third opening OPN3 corresponding to the third pixel PX3 may have a smallest area of the first opening OPN1, the second opening OPN2 and the third opening OPN3. An area ratio of the first opening OPN1, the second opening OPN2 and the third opening OPN3 reflecting the above may be about 1.1 to 1.3:1:0.7 to 0.9.

When the first, second and third openings OPN1, OPN2 and OPN3 have substantially a same length as each other in a second direction D2, the first, second and third openings OPN1, OPN2 and OPN3 may have different widths in the first direction D1 from each other. When a width of the first opening OPN1 in the first direction D1 may be referred as a width W4, a width of the second opening OPN2 in the first direction D1 may be referred as a width W5, and a width of the third opening OPN3 in the first direction D1 may be referred as a width W6, the width W4, the width W5 and the width W6 may have a width ratio of about 1.1 to 1.3:1:0.7 to 0.9.

The display device according to one or more exemplary embodiments of the present invention may realize high color reproducibility and an increased viewing angle characteristics by including the light conversion layer.

The display device according to one or more exemplary embodiments of the present invention may reduce chromaticity coordinate unbalance due to the difference in blue light conversion ratios of the red phosphor, the green phosphor and the blue phosphor by imparting different areas for the red pixel, the green pixel and the blue pixel.

The display device according to one or more exemplary embodiments of the present invention may reduce the chromaticity coordinate unbalance due to the difference in the blue light conversion ratios of the red phosphor, the green phosphor and the blue phosphor by making total capacitances of respective ones of the red pixel, the green pixel, and the blue pixel substantially equal.

The display device according to one or more exemplary embodiments of the present invention may reduce the chromaticity coordinate unbalance due to the difference in the blue light conversion ratios of the red phosphor, the green phosphor and the blue phosphor by imparting different areas for the black matrix openings of the red pixel, the green pixel and the blue pixel.

While the present invention has been illustrated and described with reference to the exemplary embodiments thereof, it will be apparent to those of ordinary skill in the art that various changes in form and detail may be made thereto without departing from the spirit and scope of the present invention.

What is claimed is:

1. A display device, comprising:
a first substrate comprising a first pixel displaying a red color, a second pixel displaying a green color and a third pixel displaying a blue color;
a second substrate facing the first substrate;
a light amount control layer positioned between the first substrate and the second substrate;
a gate line disposed on the first substrate and extending in a first direction;
a storage line disposed on the first substrate and spaced apart from the gate line; and
first, second and third data lines disposed on the first substrate and extending in a second direction intersecting the first direction,
wherein the first pixel comprises:
a first thin film transistor connected to the gate line and the first data line;
a first pixel electrode connected to the first thin film transistor; and
a first light conversion unit disposed on the second substrate and overlapping the first pixel electrode,
wherein the second pixel comprises:
a second thin film transistor connected to the gate line and the second data line;
a second pixel electrode connected to the second thin film transistor; and
a second light conversion unit disposed on the second substrate and overlapping the second pixel electrode,
wherein the third pixel comprises:
a third thin film transistor connected to the gate line and the third data line;
a third pixel electrode connected to the third thin film transistor; and
a third light conversion unit disposed on the second substrate and overlapping the third pixel electrode,
wherein an area of the first pixel electrode is greater than an area of the second pixel electrode,
wherein the area of the second pixel electrode is greater than an area of the third pixel electrode, and
wherein an overlap area between the first pixel electrode and the storage line is less than an overlap area between the second pixel electrode and the storage line.

2. The display device of claim 1, wherein an overlap area between the third pixel electrode and the storage line is different from the overlap area between the first pixel electrode and the storage line and the overlap area between the second pixel electrode and the storage line.

3. The display device of claim 1, wherein an area ratio of the first pixel electrode, the second pixel electrode and the third pixel electrode is about 1.1 to 1.3:1:0.7 to 0.9.

4. The display device of claim 1, wherein the first thin film transistor comprises:
a first gate electrode branching from the gate line;
a first semiconductor layer insulated from and overlapping the first gate electrode; and
a first source electrode and a first drain electrode disposed on the first semiconductor layer and spaced apart from each other,
wherein the second thin film transistor comprises:
a second gate electrode branching from the gate line;
a second semiconductor layer insulated from and overlapping the second gate electrode; and
a second source electrode and a second drain electrode disposed on the second semiconductor layer and spaced apart from each other, and
wherein an overlap area between the first gate electrode and the first drain electrode and an overlap area between the second gate electrode and the second drain electrode are different from each other.

5. The display device of claim 4, wherein the overlap area between the first gate electrode and the first drain electrode is larger than the overlap area between the second gate electrode and the second drain electrode.

6. The display device of claim 4, wherein the third thin film transistor comprises:
a third gate electrode branching from the gate line;
a third semiconductor layer insulated from and overlapping the third gate electrode; and
a third source electrode and a third drain electrode disposed on the third semiconductor layer and spaced apart from each other, and
wherein an overlap area between the third gate electrode and the third drain electrode is different from the overlap area between the first gate electrode and the first drain electrode and the overlap area between the second gate electrode and the second drain electrode.

7. The display device of claim 6, wherein the overlap area between the second gate electrode and the second drain electrode is larger than the overlap area between the third gate electrode and the third drain electrode.

8. The display device of claim 1, wherein the first light conversion unit comprises a red phosphor, and
wherein the second light conversion unit comprises a green phosphor.

9. The display device of claim 8, wherein the red phosphor and the green phosphor comprise at least one selected from a quantum dot, a quantum rod or a tetrapod quantum dot.

10. The display device of claim 9, wherein the quantum dot has a core-shell structure comprising a core and a shell covering the core,
wherein the core comprises at least one selected from: CdSe, CdS, CdTe, ZnS, ZnSe, ZnTe, CdSeTe, CdZnS, CdSeS, PbSe, PbS, PbTe, AgInZnS, HgS, HgSe, HgTe, GaN, GaP, GaAs, InP, InZnP, InGaP, InGaN, InAs or ZnO, and
wherein the shell comprises at least one selected from: CdS, CdSe, CdTe, CdO, ZnS, ZnSe, ZnSeS, ZnTe, ZnO, InP, InS, GaP, GaN, GaO, InZnP, InGaP, InGaN, InZnSCdSe, PbS, TiO, SrSe or HgSe.

11. The display device of claim 8, wherein the red phosphor and the green phosphor comprise at least one selected from: $Y_3Al_5O_{12}:Ce^{3+}$(YAG:Ce), $Tb_3Al_5O_{12}:Ce^{3+}$ (TAG:Ce), $(Sr,Ba,Ca)_2SiO_4:Eu^{2+}$, $(Sr,Ba,Ca,Mg,Zn)_2Si(OD)_4:Eu^{2+}$(D=F,Cl,S,N,Br), $Ba_2MgSi_2O_7:Eu^{2+}$, $Ba_2SiO_4:Eu^{2+}$, $Ca_3(Sc,Mg)_2Si_3O_{12}:Ce^{3+}$, $(Ca,Sr)S:Eu^{2+}$, $(Sr,Ca)Ga_2S_4:Eu^{2+}$, $SrSi_2O_2N_2:Eu^{2+}$, $SiAlON:Ce^{3+}$, $\beta\text{-SiAlON}:Eu^{2+}$, $Ca\text{-}\alpha\text{-SiAlON}:Eu^{2+}$, $Ba_3Si_6O_{12}N_2:Eu^{2+}$, $CaAlSiN_3:Eu^{2+}$, $(Sr,Ca)AlSiN_3:Eu^{2+}$, $Sr_2Si_5N_8:Eu^{2+}$, $(Sr,Ba)Al_2O_4:Eu^{2+}$, $(Mg,Sr)Al_2O_4:Eu^{2+}$ or $BaMg_2Al_{16}O_{27}:Eu^{2+}$.

12. The display device of claim 1, further comprising a backlight unit configured to emit blue light, the first substrate being disposed on the backlight unit.

13. The display device of claim 1, further comprising a polarizer disposed between the light amount control layer and the second substrate.

14. The display device of claim 1, wherein a first portion of the storage line extends along a first edge of the first pixel electrode and a second portion of the storage line extends along a first edge of the second pixel electrode, and
wherein an overlap area between the first pixel electrode and the first portion of the storage line of a first storage capacitor and an overlap area between the second pixel electrode and the second portion of the storage line of a second storage capacitor are different from each other.

15. The display device of claim 14,
wherein the storage line further includes a main portion extending in the first direction, and
wherein the first portion of the storage line and the second portion of the storage line extend from the main portion in the second direction.

16. The display device of claim 15,
wherein the storage line further includes a third portion extending from the main portion in the second direction,
wherein the third portion of the storage line extends along a second edge of the first pixel electrode opposite to the first edge thereof, and
wherein the first portion and the third portion are spaced apart from each other in the first direction.

17. A display device, comprising:
a first substrate comprising a first pixel and a second pixel, wherein the first pixel and the second pixel display different colors from each other;
a second substrate facing the first substrate;
a light amount control layer positioned between the first substrate and the second substrate;
a first light conversion unit positioned between the light amount control layer and the second substrate, the first light conversion unit overlapping a first pixel electrode of the first pixel;
a second light conversion unit positioned between the light amount control layer and the second substrate, the second light conversion unit overlapping a second pixel electrode of the second pixel; and
a black matrix disposed on the second substrate and having a first opening overlapping the first pixel and a second opening overlapping the second pixel,
wherein an area of the first opening is greater than an area of the second opening, and
wherein a ratio of the second light conversion unit relative to the second pixel electrode is less than a ratio of the first light conversion unit relative to the first pixel electrode.

18. The display device of claim 17, wherein the first substrate further comprises a third pixel displaying a color different from a color of the first pixel and a color of the second pixel,
- wherein a third light conversion unit positioned between the light amount control layer and the second substrate, the third light conversion unit overlapping a third pixel electrode of the third pixel,
- wherein the black matrix has a third opening corresponding to the third pixel, and
- wherein an area of the third opening has is different than the area of the first opening and the area of the second opening.

19. The display device of claim 18, wherein the first pixel displays a red color,
- wherein the second pixel displays a green color, and
- wherein the third pixel displays a blue color.

20. The display device of claim 19, wherein an area ratio of the first opening, the second opening and the third opening is about 1.1 to 1.3:1:0.7 to 0.9.

21. The display device of claim 18, wherein a ratio of the third light conversion unit relative to the second pixel electrode is less than the ratio of the second light conversion unit relative to the second pixel electrode.

22. The display device of claim 18, wherein a thickness of the black matrix is less than a thickness of at least one of the first and second light conversion units.

23. A display device, comprising:
- a first substrate comprising a first pixel and a second pixel, wherein the first pixel and the second pixel display different colors from each other;
- a second substrate facing the first substrate;
- a light amount control layer positioned between the first substrate and the second substrate;
- a gate line disposed on the first substrate and extending in a first direction;
- a storage line disposed on the first substrate and spaced apart from the gate line; and
- first and second data lines disposed on the first substrate and extending in a second direction intersecting the first direction,
- wherein the first pixel comprises:
- a first thin film transistor connected to the gate line and the first data line;
- a first pixel electrode connected to the first thin film transistor; and
- a first light conversion unit disposed on the second substrate and overlapping the first pixel electrode,
- wherein the second pixel comprises:
- a second thin film transistor connected to the gate line and the second data line;
- a second pixel electrode connected to the second thin film transistor; and
- a second light conversion unit disposed on the second substrate and overlapping the second pixel electrode,
- wherein an area of the first pixel electrode is greater than an area of the second pixel electrode,
- wherein an overlap area between the first pixel electrode and the storage line is less than an overlap area between the second pixel electrode and the storage line.

24. A display device, comprising:
- a first substrate comprising a first pixel displaying a red color, a second pixel displaying a green color and a third pixel displaying a blue color;
- a second substrate facing the first substrate;
- a light amount control layer positioned between the first substrate and the second substrate;
- a gate line disposed on the first substrate and extending in a first direction;
- a storage line disposed on the first substrate and spaced apart from the gate line; and
- first, second and third data lines disposed on the first substrate and extending in a second direction intersecting the first direction,
- wherein the first pixel comprises:
- a first thin film transistor connected to the gate line and the first data line;
- a first pixel electrode connected to the first thin film transistor; and
- a first light conversion unit disposed on the second substrate and overlapping the first pixel electrode,
- wherein the second pixel comprises:
- a second thin film transistor connected to the gate line and the second data line;
- a second pixel electrode connected to the second thin film transistor; and
- a second light conversion unit disposed on the second substrate and overlapping the second pixel electrode,
- wherein the third pixel comprises:
- a third thin film transistor connected to the gate line and the third data line;
- a third pixel electrode connected to the third thin film transistor; and
- a third light conversion unit disposed on the second substrate and overlapping the third pixel electrode,
- wherein an area of the first pixel electrode is greater than an area of the second pixel electrode,
- wherein the area of the second pixel electrode is greater than an area of the third pixel electrode,
- wherein an overlap area between the first pixel electrode and the storage line and an overlap area between the second pixel electrode and the storage line are different from each other,
- wherein an overlap area between the third pixel electrode and the storage line is different from the overlap area between the first pixel electrode and the storage line and the overlap area between the second pixel electrode and the storage line, and
- wherein the overlap area between the second pixel electrode and the storage line is less than the overlap area between the third pixel electrode and the storage line.

* * * * *